United States Patent
Karimi-Cherkandi et al.

(10) Patent No.: US 10,516,881 B2
(45) Date of Patent: *Dec. 24, 2019

(54) METHOD, DEVICE, AND SYSTEM FOR TESTING VIDEO QUALITY

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US); Thomas Nagel, Boca Raton, FL (US)

(73) Assignee: Unify GmbH & Co. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/273,285

(22) Filed: Feb. 12, 2019

(65) Prior Publication Data

US 2019/0174127 A1 Jun. 6, 2019

Related U.S. Application Data

(63) Continuation of application No. 15/825,212, filed on Nov. 29, 2017, now Pat. No. 10,250,872, which is a
(Continued)

(51) Int. Cl.
*H04N 17/00* (2006.01)
*H04N 7/025* (2006.01)
(Continued)

(52) U.S. Cl.
CPC .......... *H04N 17/004* (2013.01); *H04N 7/025* (2013.01); *H04N 7/08* (2013.01); *H04N 7/147* (2013.01)

(58) Field of Classification Search
CPC ........ H04N 17/004; H04N 7/147; H04N 7/08; H04N 7/025; G06T 7/0002;
(Continued)

(56) References Cited

U.S. PATENT DOCUMENTS 5,818,520 A 10/1998 Janko et al.
6,141,042 A * 10/2000 Martinelli ............ H04N 17/004
348/181
(Continued)

FOREIGN PATENT DOCUMENTS

CN 101213846 A 7/2008
CN 101558657 A 10/2009
(Continued)

OTHER PUBLICATIONS

International Search Report for PCT/US2012/047951 dated Jan. 18, 2013.
(Continued)

*Primary Examiner* — Melur Ramakrishnaiah
(74) *Attorney, Agent, or Firm* — Buchanan Ingersoll & Rooney PC

(57) ABSTRACT

A method and apparatus that tests video quality includes a superimposing of at least one code to a video that is to be transmitted by a communication device to another communication device. The at least one code is transmitted such that the superimposed at least one code is extractable and readable from the decoded video by the device that receives the transmitted video. The extracted at least one code may then be read to determine the quality level of the transmitted video. The determination of quality for the received video may be based upon one or more tests performed using at least one code extracted from the received video.

20 Claims, 3 Drawing Sheets

Related U.S. Application Data continuation of application No. 15/263,847, filed on Sep. 13, 2016, now Pat. No. 9,860,525, which is a continuation of application No. 14/402,410, filed as application No. PCT/US2012/047951 on Jul. 24, 2012, now Pat. No. 9,467,688.

(51) Int. Cl.
 *H04N 7/08* (2006.01)
 *H04N 7/14* (2006.01)

(58) Field of Classification Search
 CPC . G06T 2207/10016; G06T 2207/30208; G06T 2207/30168
 USPC ......... 348/14.01–14.16; 375/240.25, 240.26, 375/240.27
 See application file for complete search history.

(56) References Cited

U.S. PATENT DOCUMENTS

| | | | |
|---|---|---|---|
| 2003/0112996 A1 | 6/2003 | Hollimann et al. | |
| 2007/0216809 A1* | 9/2007 | Pirzada | H04N 17/02 348/582 |
| 2011/0032986 A1 | 2/2011 | Banger et al. | |
| 2011/0096170 A1 | 4/2011 | Villanueva et al. | |
| 2013/0027504 A1 | 1/2013 | Zhang | |
| 2013/0343467 A1* | 12/2013 | Sogani | G06T 7/0002 375/240.25 |
| 2014/0002735 A1 | 1/2014 | O'Mahony | |

FOREIGN PATENT DOCUMENTS

| | | |
|---|---|---|
| CN | 101601266 A | 12/2009 |
| CN | 102291594 A | 12/2011 |
| EP | 0888019 A1 | 12/1998 |
| EP | 2239952 A1 | 10/2010 |
| JP | 2005229214 A | 8/2005 |
| KR | 1020080099903 A | 11/2008 |
| WO | 2008094092 A1 | 8/2008 |

OTHER PUBLICATIONS

Written Opinion of the International Searching Authority for PCT/US2012/047951 dated Jan. 18, 2013.

* cited by examiner

```
┌─────────────────────────────────────────────────────────────┐
│ Superimpose at least one code within at least one frame of  │
│ a video. Each code may indicate a different quality level   │
│ for the video.                                              │
└─────────────────────────────────────────────────────────────┘
                              ↓
┌─────────────────────────────────────────────────────────────┐
│ Encode video with the at least one frame having the         │
│ superimposed at least one code for transmission.            │
└─────────────────────────────────────────────────────────────┘
                              ↓
┌─────────────────────────────────────────────────────────────┐
│ Transmit encoded video with the at least one frame having   │
│ the superimposed at least one code.                         │
└─────────────────────────────────────────────────────────────┘
                              ↓
┌─────────────────────────────────────────────────────────────┐
│ Receive the transmitted encoded video.                      │
└─────────────────────────────────────────────────────────────┘
                              ↓
┌─────────────────────────────────────────────────────────────┐
│ Decode the received video.                                  │
└─────────────────────────────────────────────────────────────┘
                              ↓
┌─────────────────────────────────────────────────────────────┐
│ For each of the at least one frame of the video having the  │
│ superimposed at least one code, extract the at least one    │
│ code.                                                       │
└─────────────────────────────────────────────────────────────┘
                              ↓
┌─────────────────────────────────────────────────────────────┐
│ Test the at least one code to assess video quality.         │
└─────────────────────────────────────────────────────────────┘
                              ↓
┌─────────────────────────────────────────────────────────────┐
│ Determine the video quality of the received video. The      │
│ video quality may include determining the resolution level  │
│ of the video. A determination that the video quality is low │
│ relative to the originally encoded video may be made by     │
│ determining that only a fraction of the total number of     │
│ superimposed codes were readable after extraction.          │
└─────────────────────────────────────────────────────────────┘
                              ↓
┌─────────────────────────────────────────────────────────────┐
│ Determine the distortion of the received video caused by    │
│ intermediary nodes positioned in the transmission path      │
│ between the sending and receiving devices by assessing the  │
│ error correction of the codes extracted from the received   │
│ video.                                                      │
└─────────────────────────────────────────────────────────────┘
```

FIGURE 2

METHOD, DEVICE, AND SYSTEM FOR TESTING VIDEO QUALITY

CROSS-REFERENCE TO RELATED APPLICATIONS

This application is a continuation of the U.S. patent application Ser. No. 15/825,212, which is a continuation application of U.S. patent application Ser. No. 15/263,847, which is a continuation of U.S. patent application Ser. No. 14/402,410, which is the United States national phase under 35 U.S.C. § 371 of PCT International Application No. PCT/US2012047951, filed Jul. 24, 2012.

FIELD OF THE INVENTION

The present invention relates to communication systems, such as communication systems that utilize cellular phones, mobile computer devices, tablets, laptops, other types of terminal devices and other types of communication devices. More particularly, the present invention relates to a system, method and device configured to permit a communication device to extract at least one code superimposed in one or more frames of a video that was received by that device and then evaluate any extracted code by running one or more tests to assess a video quality of the received video.

BACKGROUND OF THE INVENTION

The use of video transmissions has grown in the telecommunications industry. But, the testing for the quality of such video has failed to be updated to account for this growth. Traditionally, technicians tested video transmission and reception of video with the aid of still images taken from a received video. The load test environment for testing of video quality is often challenging as there are limited resources available for such testing as a load generator typically allocates a large percent of its resource in generating calls or communication connections for transmitting data.

Quality of video tests includes testing for transmission aspects and content aspects. Some transmission related issues that affect video quality include packet delay, packet jitter and packet loss. Content aspects that may affect video quality include content encoding and content decoding. Transmission issues may be addressed in data packet transmission control. Content aspects, however, can be more challenging to address. Current resources allocated to such testing often fail to permit video quality of content aspects of the video to be effectively and proficiently evaluated for assessing video quality.

We have determined that a new method, system and device are needed for improving the ability of video quality to be tested in telecommunication systems and devices used in such systems. We have determined that embodiments of the method, system and device are preferably able to permit at least one code to be included within a video to be transmitted and subsequently extracted by a device that receives the transmitted video such that the code can be evaluated by one or more tests to assess the quality of received video by the device that receives the video.

SUMMARY OF THE INVENTION

Embodiments of a system, apparatus, and method are provided herein that provide mechanism by which video transmitted between communication terminals may be tested. The testing may be used to identify one or more parameters associated with video quality to determine a quality level of video that may be transmittable between different communication terminals along a communication path by which the video was transmitted. The testing may also be utilized to perform network maintenance by identifying nodes of a network that need upgraded or replaced or by identifying metrics that can be assessed for evaluating whether a network is providing a predefined level of performance.

An embodiment of a communication system may include multiple communication terminals such as a first communication terminal and a second communication terminal. The second communication terminal may be a communication connection with the first communication terminal. The first communication terminal may superimpose at least one code within at least one frame of a video to be sent to the second communication terminal via the communication connection and then send the video with that at least one frame with the at least one superimposed code to the second communication terminal. The second communication terminal may receive the sent video and extract the at least one code from the sent video to evaluate at least one parameter of the video indicative of a video quality of the sent video.

Examples of the one or more parameters of the video indicative of a video quality may include image resolution and frame rate. Of course, other parameters related to video quality may also be assessed.

The first and second communication terminals may each be any of a number of different types of communication endpoints. For instance, the communication terminals may each be a cellular phone, desktop computer, workstation, laptop computers, mobile telephone, internet appliance, tablet, a telephone device, a personal digital assistant, or other type of computer device.

The communication connection between the first and second communication terminals may be any of a number of different types of connections. For instance, the communication connection may be a direct connection defined by a direct wireless transmission between the terminals or via a wired transmission path that consists of a wired path defined directly from the first communication terminal to the second communication terminal. As another example, the communication connection may include a network connection that involves a transmission path that includes multiple hops at different network nodes such as access points, switch devices, base stations, or other network elements. The network connection may include a wired path, a wireless transmission path, or a combination of wired and wireless transmission paths.

In some embodiments of the system, the video that is sent by the first communication terminal is sent prior to establishing a video call or a video conference call to determination a resolution level of the video to be transmitted during that call. The at least one code may be any of a number of codes. For instance, one type of code that is used may be a quick response code.

The at least one frame of the video may be any of a number of different frames or frame types or frame type combinations. The number of frames that have superimposed codes may be any of a number of different types and configurations for use in any of a number of different predefined testing methodologies for example. As one example, the at least one frame may include one frame that is an intra-coded picture frame of a video, or I-frame of the video. As another example, the at least one frame may be a plurality of frames and the at least one code may be one code that is separated into multiple fragments. A respective one of each of the fragments may be included in a respective one of the frames of the video. As yet another example, the frames may comprise numerous codes that each contains multiple different codes containing the same content at different sizes for purposes of providing a parameter of the video along with an indication of a level of error associated with the transmission of the video. It should be understood that each of the frames of the video that has at least one superimposed code may be an intra-coded picture frame, a predicted picture frame or a bi-predictive picture frame.

In one embodiment, the video that is sent includes a plurality of frames that includes a first frame, a second frame, a third frame and a fourth frame. The first frame may include a mono-chromatic background with a super imposed static code. The second frame may include a multi-colored background with a super imposed static code. The third frame may include a moving multi-colored background with a super imposed code. The fourth frame may include a mono-chromatic static background with a moving superimposed code. The first and second frames may be intra-coded picture frames, or I-frames, in some embodiments and the third and fourth frames may be predicted picture frames or bi-predictive picture frames in some embodiments. In other embodiments, the first, second, third and fourth frames may each be one of an intra-coded picture frame, a predicted picture frame or a bi-predictive picture frame.

A method of testing quality of a received video is also provided. The method includes the steps of a first communication terminal receiving a video transmitted by a communication device, the first communication terminal extracting at least one code superimposed in at least one frame the received video, the first communication terminal reading the extracted at least one code to evaluate at least one parameter of the received video indicative of a quality of the received video, and the first communication terminal determining a value for the at least one parameter to identify a quality level of the received video.

Embodiments of the method may also include other steps. For instance, the first communication terminal may determine a level of distortion of the received video. The determination of the level of distortion may occur by the first communication terminal determining an amount of error correction applied to read the extracted at least one code and correlating the amount of error correction applied to an amount of distortion.

The communication device that sent the video received by the first communication terminal may be any of a number of different devices. For instance, the communication device may be a second communication terminal. As another example, the communication device may be a switch device, an access point, or a network node.

The communication connection by which the video was received by the first communication terminal may be any of a number of different connections. For instance, the connection may be a direction connection. As another example, the connection may be a network connection or other connection defined by a transmission path having multiple hops via intermediary devices such as network nodes or other types of network elements.

A non-transitory computer readable medium having at least one application stored thereon that is executable by a processor unit of a communication terminal is also provided. The at least one application of such a medium may define a method that comprises a number of steps. For example, the method may include the steps of the communication terminal, extracting at least one code superimposed in at least one frame of a received video, the communication terminal reading the extracted at least one code to evaluate at least one parameter of the received video indicative of quality of the received video, and the communication terminal determining a value for the at least one parameter to identify a quality level of the received video. The steps of such a method may also include other steps in some embodiments of the computer readable medium. For example, the method defined by the one or more applications may include the step of the communication terminal determining a level of distortion of the received video by determining an amount of error correction applied to read each of the extracted at least one code and correlating the amount of error correction applied to an amount of distortion.

In one embodiment, the computer readable medium is a hard drive, flash drive, a type of compact disc ("CD") or a type of digital versatile disc ("DVD"), a floppy disc, or other memory of a communication terminal. For instance, an embodiment of the computer readable medium may be memory of a communication terminal of an embodiment of our communication system.

Other details, objects, and advantages of the invention will become apparent as the following description off, certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 2 is a flow chart illustrating an exemplary method for testing video quality.

DETAILED DESCRIPTION OF EXEMPLARY EMBODIMENTS

Figure 1:
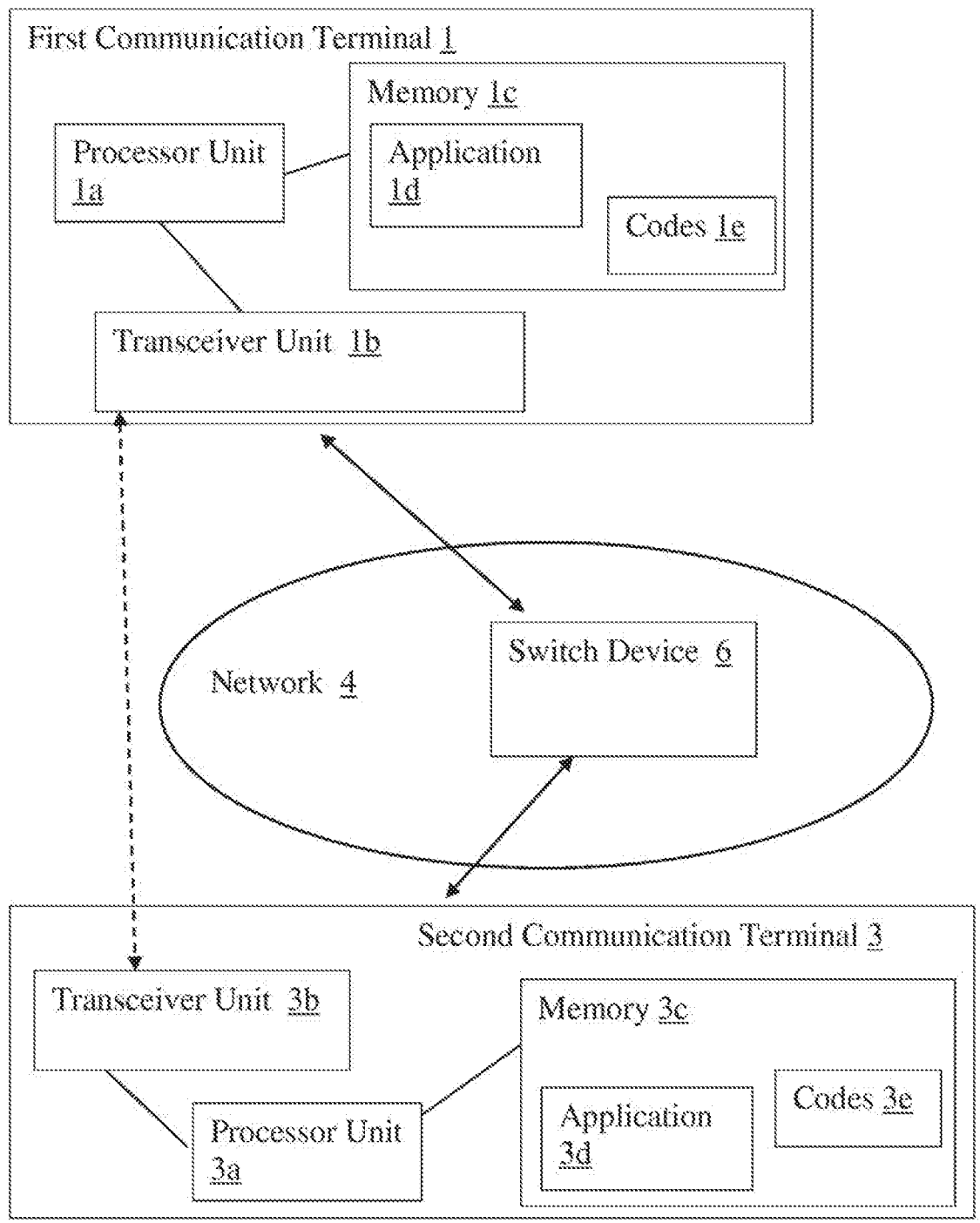
FIG. 1 is a block diagram of an exemplary communication system. An arrow is illustrated in broken line to illustrate an optional or alternative direct communication connection between the First and second communication terminals. Such a direct communication connection may be formed via a wired transmission path defined by a cable or other wiring interconnecting the two terminals or a direct wireless transmission path formed via wireless transceivers of the terminals.

Referring to FIGS. 1-2, a first communication terminal 1 may communicate with a second communication terminal 3 to send data via a connection established between the terminals. Such data may include a video transmitted in one or more data packets sent from the first communication terminal 1 to the second communication terminal 3. The video data may contain pictorial data such as one or more images and also contain audio data. The communication connection established between the first and second communication terminals 1 and 3 may be formed via a network connection or via a direction connection. For example, the first communication terminal may be connected to a network 4 and communicate with a switch device 6 for establishing a connection with the second communication terminal 3 and transmitting data to the second communication terminal 3. As an alternative example, the first communication terminal 1 may have a communication connection established directly with the second communication terminal 3 as shown in broken line in FIG. 1 via a wireless communication connection such as a Bluetooth wireless communication path connection, a Wi-Fi wireless communication connection path, or a wired transmission path connection such as a universal serial bus ("USB") interconnection.

It should be appreciated that the network 4 may include a number of network nodes such as access points, gateways, survivable proxy devices, border control elements, and other network elements that may communicatively connect with the communication terminals connected to the network 4. For instance, each communication terminal may be connected to the network via an access point (not shown) such as a router or base station. It should also be appreciated that the network 4 may be a local area network, wide area network, or cellular network. The switch device may be a server, a private branch exchange, a softswitch, or other computer device that facilitates the establishment of a communication session or an establishment of a communication connection such as a video call or a phone call. It should also be understood that a connection between the first and second terminals 1 and 3 may involve a transmission path defined by multiple network nodes such as, for example, multiple access points and at least one switch device.

The first communication terminal 1 may include a processor unit 1a that is communicatively coupled to memory 1c and a transceiver unit 1b. The memory 1c may be non-transitory memory such as a hard drive, flash drive or other memory. The memory 1c may have at least one application 1d stored thereon and a plurality of predefined codes 1e stored thereon. The processor unit 1a may be configured to execute the application 1d stored in the memory 1c. The application 1d may be configured to call the codes 1e for including one or more codes in frames of a video when the application is executed by the processor unit 1a and may also be configured to create the codes for including in one or more frames of a video when the application 1d is executed. The application 1d may define steps of a method that the communication terminal executes when the application is executed by the processor unit 1a. Steps of such a method may be appreciated from FIG. 2 and from the below. Such steps may each be defined by program code that may define the application 1d.

The transceiver unit 1b may be configured to include one or more receiver units and one or more transmitter units for transmitting and receiving data. For instance, the transceiver unit 1b may be configured to communicate with the network 4 and to also directly communicate with a transceiver unit of the second communication terminal 3 for forming a direct connection between the terminals shown in broken line in FIG. 1. The first communication terminal 1 may also include one or more input devices and one or more output devices communicatively connected to the processor unit 1a. For instance, a camera sensor, a keyboard, a touch screen display unit, a microphone, and a speaker may each be communicatively connected to the processor unit 1a. The input devices may be used to record video and audio and transmit such recorded audio and video. For instance, the camera sensor and microphone may record audio and video for saving in the memory 1c. The recorded audio and video, may then be transmitted via the transceiver unit 1b.

The second communication terminal 3 may include a processor unit 3a that is communicatively coupled to a transceiver unit 3b and memory 3c. The memory 3c may be non-transitory memory such as a hard drive, flash drive or other memory. The memory 3c include at least one application 3d and codes 3e. The processor unit 3a may be configured to execute the application 3d stored in the memory 3e. The application 3d may define steps of a method that the communication terminal executes when the application is executed by the processor unit 3a. Steps of such a method may be appreciated from FIG. 2 and from the below. Such steps may each be defined by program code that may define the application 3d. The second communication terminal 3 may also include one or more input devices and one or more output devices communicatively connected to the processor unit 3a. For instance, a camera sensor, a keyboard, a touch screen display unit, a microphone, and a speaker may each be communicatively connected to the processor unit 3a. The input devices may be used. to record video and audio and transmit such recorded audio and video. For example, the camera sensor and microphone may be used to record audio and video for saving in the memory 3c. The recorded audio and video may then be transmitted via the transceiver unit 3b.

The first communication terminal 1 may send video and audio data to the second communication terminal 3 via a connection established, between the terminals. As shown in FIG. 1, such a connection may be via a network connection that utilizes multiple network nodes such as one or more access points and one or more switch devices. Alternatively, such a connection may be a direct connection between the terminals, such as a wired transmission path that is only between the two terminal devices or a wireless transmission path that only includes the two terminals.

The video that is sent via the connection may be comprised of a plurality of frames of images. The video may have been contemporaneously captured via the camera sensor and stored for transmission as done in a video call or may be a video previously stored for transmitting, as done in an electronic mail transmission such as an e-mail or short messaging service message, such as a text message.

Each frame of the video that is sent may have a separate image. The series of frames may be in a predefined order to define the video. The frames of the video may each define a complete image captured during a known time interval or predefined time period. For instance, each frame of the video may be an intra-coded picture frame, which may also be called an I-frame. Some of the frames may alternatively include predicted picture frames, which are also known as P-frames or delta-frames. Such frames may also include bi-predictive picture frames, which are also known as B-frames. The frames of the video may also include a combination of I-frames, B-frames, and P-frames, The recorded video may be encoded with just I-frames, a combination of I-frames and B-frames, a combination of P-frames and I-frames, a combination I-frames, B-frames, and P-frames, or any other combination of such frames when recorded, when encoded, or may otherwise be so formatted prior to being transmitted. The use of P-frames and B-frames within the video may be used to reduce the amount of memory needed for saving the video as the use of such frames can adjust the amount of memory space needed for saving the video or may be used to reduce bandwidth requirements for transmission of the video as the use of P-frames and B-frames can reduce the amount of bandwidth needed for transmitting the video.

Figure 3:
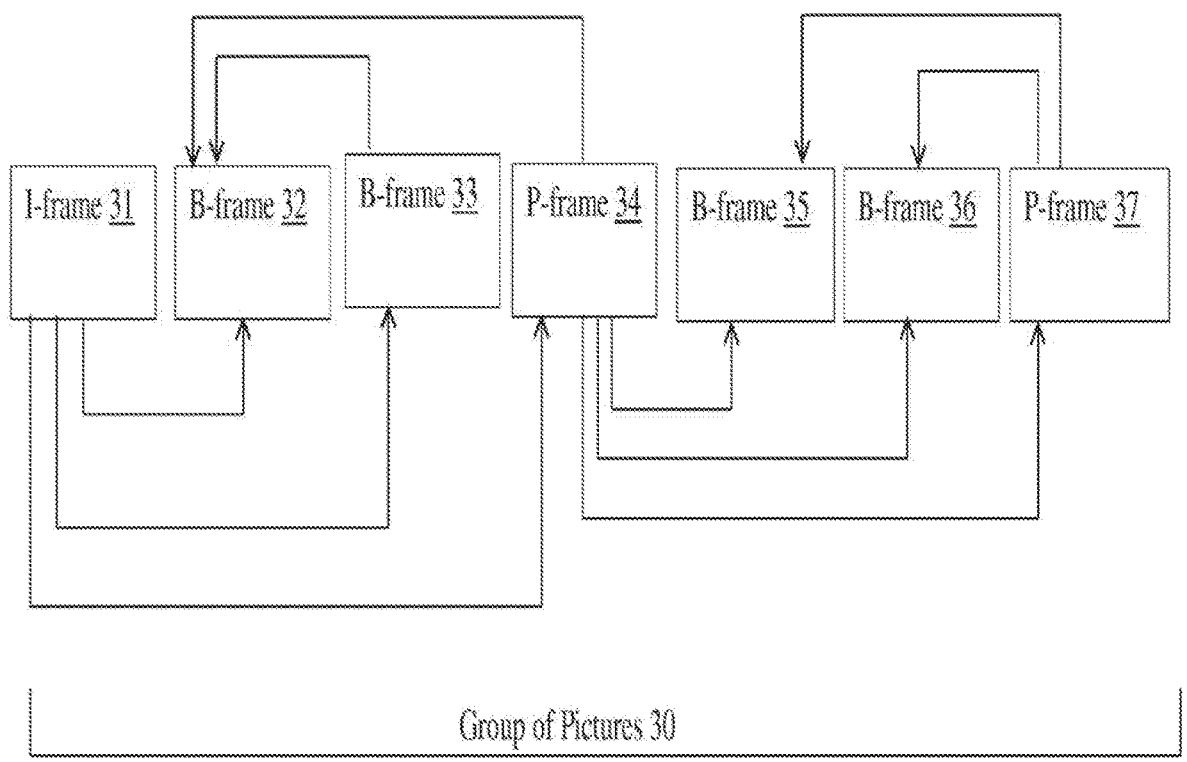
FIG. 3 is a schematic view of an exemplary embodiment of a group of pictures that may comprise a portion of a video. The group of pictures includes a plurality of frames that comprise part of the video. It should be understood that the embodiment of the group of pictures illustrated in FIG. 3 may be transmitted using the embodiment of the method illustrated in FIG. 2 and the embodiment of the system illustrated in FIG. 1.

On example of a portion of a video that may be sent for testing purposes is shown in FIG. 3. The portion of the video may be a group of pictures 30 that includes a plurality of frames of the video. The frames may include a first frame that is an I-frame 31, a second frame that is a B-frame 32, a third frame that is a B-frame 33, a fourth frame that is a P-frame 34, a fifth frame that is a B-frame 35, a sixth frame that is a B frame 36 and a seventh frame that is a P-frame 37. The group of pictures 30 may include all seven of these frames in sequential order as shown in FIG. 3.

The I-frame 31 may be decoded for display without requiring any decoding of any preceding frames. As shown by the arrows illustrated in FIG. 3 to indicate points of reference for the decoding of the frames, the B-frame 32 may require the decoding of the I-frame 31 before it can be decoded as a reference point for the decoding of the B-frame. The B-frame 33 may require the I-frame 31 and the B-frame 32 to be decoded first as points of reference for decoding the B-frame 33. The P-frame 34 may also require the decoding of the I-frame 31 and the B-frame 32. The B-frame 35 may require the P-frame 34 to be decoded as a point of reference before that frame can be decoded. B-frame 36 may require the P-frame 34 to be decoded as a point of reference for the decoding of B-frame 36. The P frame 37 may require the P-frame 34, and B-frames 35 and 36 to be decoded as points of reference for the decoding of the P-frame. It should be appreciated that the B-frames and P-frames require one or more other frames to be decoded for predictive decoding to occur.

Prior to sending the video, the first communication terminal 1 may superimpose at least one code onto at least one frame of the video. Each of the codes may represent a respective quality level and include indicia or other information indicating a quality level. One example of the codes that may be superimposed is a quick response code, which is also known as a QR code. A QR code is a type of two dimensional bar code that stores information in both a vertical path and a horizontal path of a bar code symbol defining the code. Another example of a type of code that may be used for superimposing on one or more frames of the video that is to be sent is a three dimensional bar code, which is also referred to as a bumpy bar code. An example of superimposing one or more codes may be to overlay one or more code images on a picture of a frame of the video or a portion of the picture of the frame of the video.

For example, the processor unit 1a of the first communication terminal 1 may superimpose at least one code on a picture of an I-frame of the video to be sent. At least one code may be overlaid on a chart, a graph, an image, a presentation slide, or other picture of the I-frame, for example. The video with the superimposed one or more codes may then be encoded for transmission and transmitted to the second communication terminal 3. The second communication terminal 3 may receive the sent encoded video and decode the received video and subsequently extract any superimposed codes from that video. For instance, the processor unit 3a of the second communication terminal 3 may execute one or more applications that permit the second communication terminal to identify which frames of the video include any superimposed codes and extract those superimposed codes.

The at least one code that is extracted from the video may then be tested by the second communication terminal 3 to determine what the video quality level of the transmitted video is. The determination may result in determining the video quality such as a resolution level of the video or a frame rate of a video. The frame rate of a video may also be referral to as a frame frequency of a video. The frame rate may be yet another video quality parameter indicative of a quality of the video as the more frames per unit time (e.g. second, minute, etc.), the better the video will typically appear to a user when the video is output as the higher frame rate can reduce motion blur or flickering that may occur during video output of video at slower frame rate.

The second communication terminal 3 may determine that the resolution level of the video or other video parameter indicating a video quality level is low relative to the originally encoded video that was encoded by the first communication terminal 1 by determining that only a fraction of the total number of superimposed codes were readable by the second communication terminal 3 after extraction of the one or more codes from that video. If the transmission path along which the video was transmitted included one or more network nodes of a network connection between the first and second communication terminals, the second communication terminal 3 may then determine the distortion of the received video caused by intermediary nodes position in the transmission path between the first and second communication terminals 1 and 3 by assessing the error correction of the extracted one or more codes.

The second communication terminal 3 may then remove the superimposed codes from the frames of the video and then output the video via a display unit of the second communication terminal 3, such as a touch screen display, liquid crystal display, or monitor that is communicatively coupled to the processor unit 3a of the second communication terminal 3. Alternatively, the video may be output without removing the one or more superimposed codes. As the codes may only be on a few frames of the video, the codes may not be noticeable when output as a video by human eyes watching the video via an output device of the second communication terminal 3 or communicatively connected to the processor unit 3a of the second communication terminal 3.

It is contemplated the embodiments of the first and second communication terminals 1 and 3 may include applications that are configured to define reading and creating of codes that may be superimposed and extracted from videos for transmitting and receiving a video. For example, an opens source application such as Zebra Crossing software distributed by Google Inc. or other barcode creation and decoding software may be utilized by storing it in memory and having a processor unit execute the application for extracting a code from a video or creating a code for superimposing the code in the video prior to transmitting the video.

The processor unit of the communication terminal sending a video may be configured to run an application stored on its memory, such as GraphicsMagick software that is distributed by GraphicsMagick Group for example, that permits the processor unit to perform an overlay function, which may also be called a Coalesce command. Of course, other software may be utilized as an alternative to the GraphicsMagick application. The communication terminal may overlay one or more codes upon execution of such an application. User input may also be provided via one or more input devices communicatively connected to the processor unit of the communication terminal for creating codes, superimposing the codes, or for extracting the codes.

It should be appreciated that any of a number of formats to the code or codes superimposed in a frame of a video may be used. UPC-A barcode format, UPC-E barcode format, EAN-8 barcode format, EAN-13 barcode format, Code 39 barcode format, Code 93 barcode format, Code 128 barcode format, ITF barcode format, Codabar barcode format, RSS-14 or an RSS-14 variant barcode format. Data Matrix barcode format, Aztec barcode format, PDF 417 barcode format, or a quick response code barcode format may be used for example.

Each code that is superimposed in a frame of a video may also be configured to provide error correction capability. For instance, some codes are configured so that data stored in the code may be restored even if the symbol is partially dirty or damaged upon decoding, of the code code may be restored even if the symbol is partially dirty or damaged upon decoding of the code or extraction of the code. The use of a quick response code format may be currently preferred over other types of formats because quick response codes are capable of omni-directional high speed reading that utilizes position detection patterns located at different corners of a code symbol, which can help guarantee a stable high speed reading and circumvent negative effects of background interference that could occur from the code being overlaid on another image. Quick response code may also be divided into multiple data areas so that multiple symbols of a quick response code may be reconstructed as a single data symbol. While a quick response code format may provide some advantages relative to other code options, it should be understood that any of a number of code options may be utilized in different embodiments to meet any of a number of possible design objectives.

The communication terminals that send and receive a transmitted video, such as the first and third communication terminals 1 and 3, may utilize one or more testing methodologies for assessing one or more parameters that are indicative of the video quality of the transmitted and received video. For instance, a mono-chromatic background with super imposed static code may be one frame that is sent in a video to another communication terminal for evaluation of the code contained therein. Additionally, a multi-colored background with a super imposed static code may be used in a frame of the video that is sent for extraction and evaluation by the recipient communication terminal. Other frames that include superimposed codes for testing may include vertically, horizontally, or diagonally sliding multi colored background with superimposed code, and one or more frames including mono chromatic static background with vertically, horizontally, diagonally sliding superimposed code. I-frames may be used for static background and static code frames. P-frames and B-frames may be utilized for the sliding background test frames or the moving background test frames. The video sending communication terminal, such as the first communication terminal 1, may create the different test frames for inclusion in the sent video and encode the video for transmission. The receiving communication terminal, such as the second communication terminal 3, may then receive the video and review the test frames for evaluating the frames and determining at least one parameter indicative of the video quality of the received video.

One example of the first and second communication terminals utilizing a predetermined testing methodology may be the first communication terminal sending a message with a parameter indicating which one of a number of different testing methodologies is to be used by the second communication terminal for assessing video to be sent to the second communication terminal. In some embodiments, that parameter may indicate a methodology that requires the decoding of just one frame that includes a plurality of codes to be extracted and decoded or may alternatively be a methodology that includes the sending of multiple frames in a sequential order that each include one code for extraction and decoding. The methodology that is selected may be utilized for identifying error and error level in addition to determining the quality of video that is transmittable over the communication path defined between the first and second communication terminals.

For example, if only one frame is to have codes superimposed therein, the first of the superimposed codes may have a larger code that indicates a highest video resolution and there may be additional codes that are each of a smaller size than a prior code and indicate a lower video resolution. For example, the first frame may include three codes, the first code may have a first content that is of a largest size, the second code may include the same content but be of an intermediate size that is smaller than the largest size and the third code may have the same content as the first and second codes, but be of a smallest size. The second communication terminal 3 may extract all the codes from the frame and try to read those codes. If the third code or, second code was not readable or detectable, then the amount of error correction used to decode that third code or second code may be used to identify the error and level of error involved in the transmission of the video over the transmission path. Of course, the number of codes used in the frame may be a number much larger than 3 codes to provide a better indication for identifying a level of error correction utilized for reading codes extracted from the received. video for use in determining a level of error that occurs for transmission of video over the communication path defined between the first and second communication terminals for transmitting the video.

As another example of a testing methodology that may be utilized by the first and second communication terminals 1 and 3, one code may be broken into different fragments, or portion and subsequently superimposed into multiple frames of a video sent to the second communication terminal for extraction. The entire code may only be obtained after extraction of all the fragments from all the sent frames. The fragments from one code that are sent in a group of pictures 30 of a video may be sent so that a first fragment of the code is included in an I-frame 31, a second fragment is included in B-frame 32, a third fragment is included in B-frame 33, a fourth fragment is included in P-frame 34, a fifth fragment is included in B-frame 35, a sixth fragment is included in B-frame 36 and a seventh fragment is included in frame 37. The detection of the code transmitted with the video may only occur upon extracting all seven fragments from the frames. Each group of pictures 30 may include frames that have a fragment from multiple different codes so that multiple codes may be extracted from the group of pictures 30. Each of the codes may include different content and be of a different size. The largest code that is extractable and readable by the second communication terminal 3 may indicate the best quality of video receivable via the transmission path along which that group of pictures 30 was sent by the first communication terminal.

As yet another example of a testing methodology that may be utilized by the first and second communication terminals 1 and 3, the first communication terminal 1 may send an intentionally corrupted code that can or cannot be decoded by the second communication terminal 3 using error correction code. The most corrupted code that is readable by the second communication terminal may indicate the video quality of the video receivable by the second communication terminal 3.

As yet another example of a testing methodology that may be utilized by the first and second communication terminals, a combination of any of the above mentioned testing methodologies may be utilized. For instance, a first group of pictures may be utilized for detecting a best or highest resolution video quality for a video transmittable along the transmission path between the first and second communication terminals. A second group of pictures may be included in that video and be configured for detecting an error level involved in the transmission of the video. A third group of pictures may be sent for identifying a frame rate, such as how many frames are moved per second of the video.

If the transmission path between the sending and receiving communication terminals includes one or more intermediary nodes, such as a network node (e.g. an access point, a switch device 6, etc.), the evaluation of the received video performed by the receiving communication terminal such as the second communication terminal 3 may also include a detection of code distortion. The amount of error correction applied to each superimposed code may be correlated with a level of distortion to assess the impact the intermediate nodes had on the video quality of the received video. The level of distortion may result from any of the nodes dropping data packet or corrupting a data packet of the video sent during the transmission of the video from the first communication terminal 1 to the second communication terminal 1. If any of the nodes are active nodes, they may also add to distortion by decoding and encoding or transcoding the video during the transmission of the video. An example of an active node would be a media server or a conference server that be use used in a communication between the communication terminals. Such devices may provide a media protocol conversation for example and be used to alter the protocol of the transmitted video from one terminal to another terminal. For example, such an active node may convert video sent in accordance with H.264 protocol to video in VP8 protocol and vice versa.

It should be understood that the H.264 protocol is a protocol standard for video compression that was developed by with the International Organization for Standardization (ISO)/International Electrotechnical Commission (IEC) joint working group, the Moving Picture Experts Group (MPEG). The product of this partnership effort is known as the Joint Video Team (JVT). The ITU-T H.264 standard and the ISO/IEC MPEG-4 AVC standard (formally, ISO/IEC 14496-10-MPEG-4 Part 10, Advanced Video Coding) are jointly maintained so that they have identical technical content. The VP8 is an open video compression format that is currently owned by Google, Inc.

In some embodiments of our method, apparatus, and system, the testing of the received video that is performed by the receiving communication terminal such as the second communication terminal may only be performed upon the establishment of the connection. For example, the first communication terminal may send a first video to the second communication terminal for testing purposes for establishing a connection for transmitting a second video to the second communication terminal such as video for a video conference or video for a telecast or broadcast. The first video may be a predefined video that includes different slides with superimposed or overlaid codes for testing purposes as discussed above. The codes used in the first video may be according to a predefined plan so that the receiving communication terminal can correlate the received codes that are readable with one or more parameters to detect a quality of the received video. If the quality meets a predetermined quality threshold by being at or exceeding at least one video quality parameter level such as a predefined resolution level and a predefined frame rate, the connection may be maintained or the establishment of the connection may be completed.

If the quality level fails to meet the desired level, the establishment of the connection may be continued by creating a new connection path that uses an alternative transmission path to attempt to obtain a better quality video or the second communication terminal 3 may report data indicating the insufficient quality level for the connection to the switch device 6 or a media server or bandwidth manager so that further resources may be allocated to the connection sought to be established and formed between the first and second communication terminals 1 and 3. If a message reporting on the insufficiency of the connection is sent to a network node or network element for allocating more network resources to the connection to address the identified insufficiency, the network element may then send a response to the first and second communication terminals 1 and 3 indicating that further resources have been provided to the connection so that the communication terminals may reinitiate the sending of video for testing the video quality of the video transmitted over the connection sought to be established. The new resources may be an allocation of additional bandwidth or a reassigning of nodes along which a transmission path is defined within the network 4 that defines the connection between the first and second communication terminals 1 and 3. Alternatively, the network element may respond to the communication terminals 1 and 3 to inform the terminals that no further resources am available.

Embodiments of our apparatus, system and method may also be used for other purposes. For instance, video quality testing may be utilized for finding flaws in a communication network as part of maintenance and upgrading of a network, such as a private enterprise network. Communication terminals may transmit video for testing purposes to identify active and passive nodes within a network that need upgrading or that need replaced, for example. The testing could also be utilized to identify network performance issues or identify congestion points within an enterprise network that affects video transmission capabilities at certain times of day. As yet another example, such testing may be utilized to measure network load and performance for purposes of identifying metrics for use in maintaining a desired network load or network performance level.

It should be understood that embodiments of the system, communication terminals, and methods discussed above may be variously implemented to meet different design objectives. For instance, the communication terminals may be any of a number of different types of communication endpoints such as desktop computers, mobile telephones, cellular phones, personal digital assistants, tablets, laptop computers, internet appliances, or other communication computer devices configured to sending or receiving video. As another example, the network 4 may be a local area network, a cellular network, or may be any of a number of types of wide area networks such as the internet or an enterprise network. As yet another example, the format for codes used in the superimposing and extraction of video may be selected from any of a number of different codes formats or includes the use of a combination of different code formats. As yet another example, the information contained in the codes to indicate a quality level or parameter associated with a quality level of a received video may include any of a number of types of information and the included information may be defined according to a predefined schema so that information contained in the code corresponds to a particular quality level or value indicating of video quality. The information contained within a code may alternatively be defined so that when the code is read the information provided by the code identifies a quality level of the received video to the receiving communication terminal.

While certain present preferred embodiments of a communication terminal, non-transitory computer readable medium executable by a communication terminal, a communication system, and methods of making and using the same have been shown and described above, it is to be distinctly understood that the invention is not limited thereto but may be otherwise variously embodied and practiced within the scope of the following claims.

What is claimed is:

1. A communication apparatus comprising:
    a first communication device having a processor communicatively connected to a non-transitory computer readable medium;
    the first communication device configured to superimpose at least one code within at least one frame of a video to be sent to a second communication device and subsequently send the video with the at least one frame having the at least one superimposed code to the second communication device;
    wherein the video with the at least one frame having the at least one superimposed code comprises at least one of:
        a first frame comprising a mono-chromatic background with a super imposed code,
        a second frame comprising a multi-colored background with a super imposed code,
        a third frame comprising a moving multi-colored background with a super imposed code, and
        a fourth frame comprising a mono-chromatic static background with a moving superimposed code.

2. The communication apparatus of claim 1 comprising the second communication device connected to the first communication device.

3. The communication apparatus of claim 2, wherein the first communication device is connected to the second communication device via a direct connection between the first and second communication devices.

4. The communication apparatus of claim 2, wherein the video is to be sent prior to establishing a video call or a video conference call to determine a resolution level of the video to be transmitted during the video call or the video conference call.

5. The communication apparatus of claim 2, wherein the at least one code is comprised of a quick response code and the at least one frame is a plurality of frames and wherein the at least one code superimposed in the at least one frame is comprised of the quick response code being separated into a plurality of fragments and each of the fragments being superimposed in a respective one of the frames.

6. The communication apparatus of claim 1, wherein the at least one code is comprised of a quick response code and the at least one frame is a plurality of frames and wherein the at least one code superimposed in the at least one frame is comprised of the quick response code being separated into a plurality of fragments and each of the fragments being superimposed in a respective one of the frames.

7. The communication apparatus of claim 1, wherein the video is comprised of the first and second frames, the first frame being an intra-coded picture frame of the video and the second frame being an intra-coded picture frame of the video.

8. The communication apparatus of claim 7, wherein the video is also comprised of the third frame, the third frame being a predicted picture frame of the video or a bi-predictive picture frame of the video.

9. The communication apparatus of claim 8, wherein the video is also comprised of the fourth frame, the fourth frame being a predicted picture frame of the video or a bi-predictive picture frame of the video.

10. The communication apparatus of claim 7, wherein the video is also comprised of the fourth frame, the fourth frame being a predicted picture frame of the video or a bi-predictive picture frame of the video.

11. The communication apparatus of claim 1, wherein the video is comprised of the third frame, the third frame being a predicted picture frame of the video or a bi-predictive picture frame of the video.

12. A method for assessing video quality comprising:
    a first computer device superimposing at least one code within at least one frame of a video to be sent to a second communication device for subsequently sending the video with the at least one frame having the at least one superimposed code to the second communication device, the first computer device having a processor communicatively connected to a non-transitory computer readable medium;
    wherein the video with the at least one frame having the at least one superimposed code comprises at least one of:
        a first frame comprising a mono-chromatic background with a super imposed code,
        a second frame comprising a multi-colored background with a super imposed code,
        a third frame comprising a moving multi-colored background with a super imposed code, and
        a fourth frame comprising a mono-chromatic background with a moving superimposed code.

13. A non-transitory computer readable medium having at least one application stored thereon that is executable by a processor of a first communication device, the at least one application defining a method comprising:
    superimposing at least one code within at least one frame of a video to be sent to a second communication device for subsequently sending the video with the at least one frame having the at least one superimposed code to the second communication device;
    wherein the video with the at least one frame having the at least one superimposed code comprises at least one of:
        a first frame comprising a mono-chromatic background with a super imposed code,
        a second frame comprising a multi-colored background with a super imposed code,
        a third frame comprising a moving multi-colored background with a super imposed code, and
        a fourth frame comprising a mono-chromatic static background with a moving superimposed code.

14. The non-transitory computer readable medium of claim 13, wherein the video is to be sent prior to establishing a video call or a video conference call to determine a resolution level of the video to be transmitted during the video call or the video conference call, and the method also comprises sending the video with the at least one frame having the at least one superimposed code to the second communication device.

15. The non-transitory computer readable medium of claim 13, wherein the at least one code is comprised of a quick response code and the at least one frame is a plurality of frames and wherein the at least one code superimposed in the at least one frame is comprised of the quick response code being separated into a plurality of fragments and each of the fragments being superimposed in a respective one of the frames.

16. The non-transitory computer readable medium of claim 13, wherein the at least one code is comprised of a quick response code and the at least one frame is a plurality of frames and wherein the at least one code superimposed in the at least one frame is comprised of the quick response code being separated into a plurality of fragments and each of the fragments being superimposed in a respective one of the frames.

17. The non-transitory computer readable medium of claim 13, wherein the video is comprised of the first and second frames, the first frame being an intra-coded picture frame of the video and the second frame being an intra-coded picture frame of the video.

18. The non-transitory computer readable medium of claim 17, wherein the video is also comprised of the third frame, the third frame being a predicted picture frame of the video or a bi-predictive picture frame of the video.

19. The non-transitory computer readable medium of claim 18, wherein the video is also comprised of the fourth frame, the fourth frame being a predicted picture frame of the video or a bi-predictive picture frame of the video.

20. The apparatus of claim 17, wherein the video is also comprised of the fourth frame, the fourth frame being a predicted picture frame of the video or a bi-predictive picture frame of the video.

\* \* \* \* \*